Patented May 22, 1951

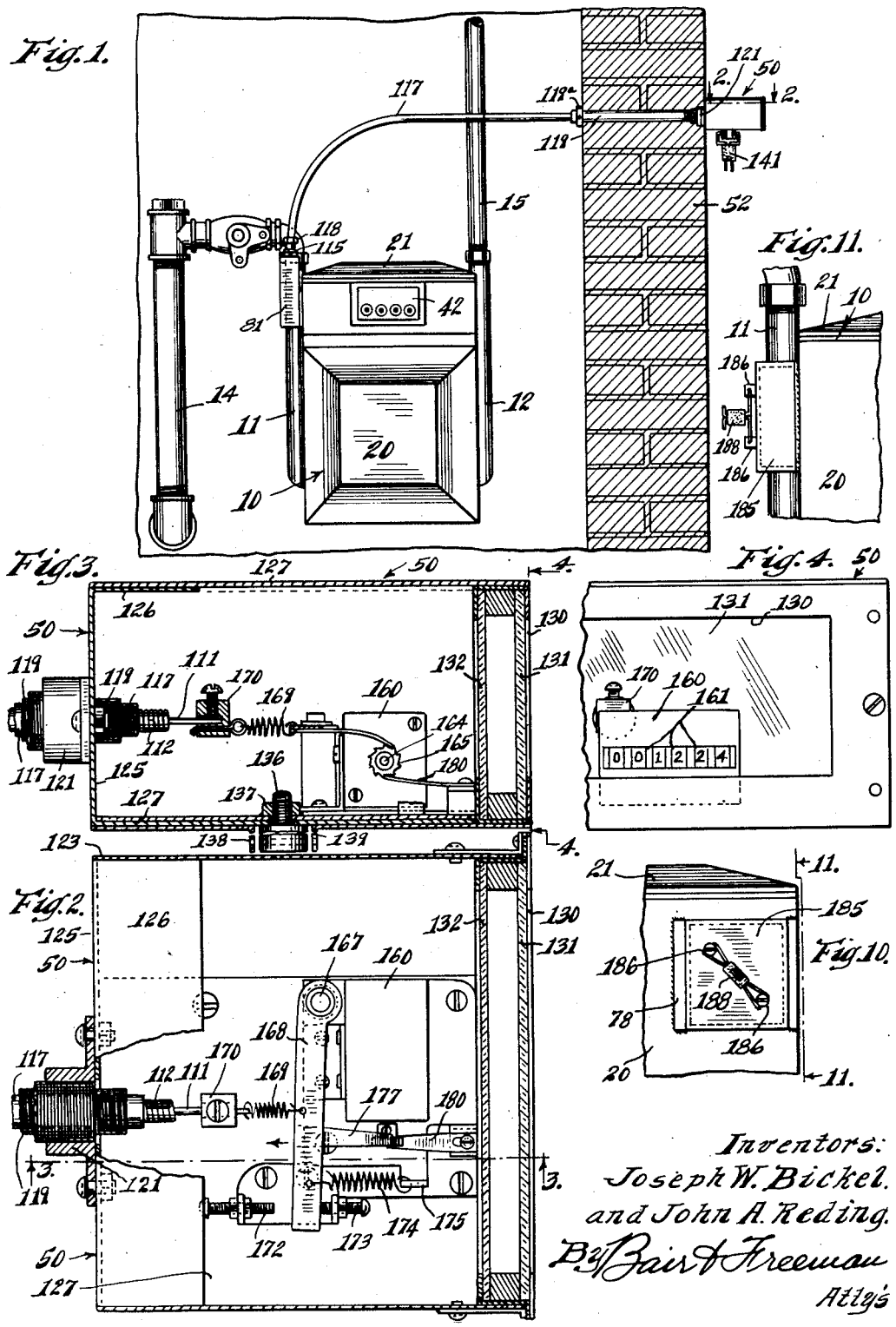

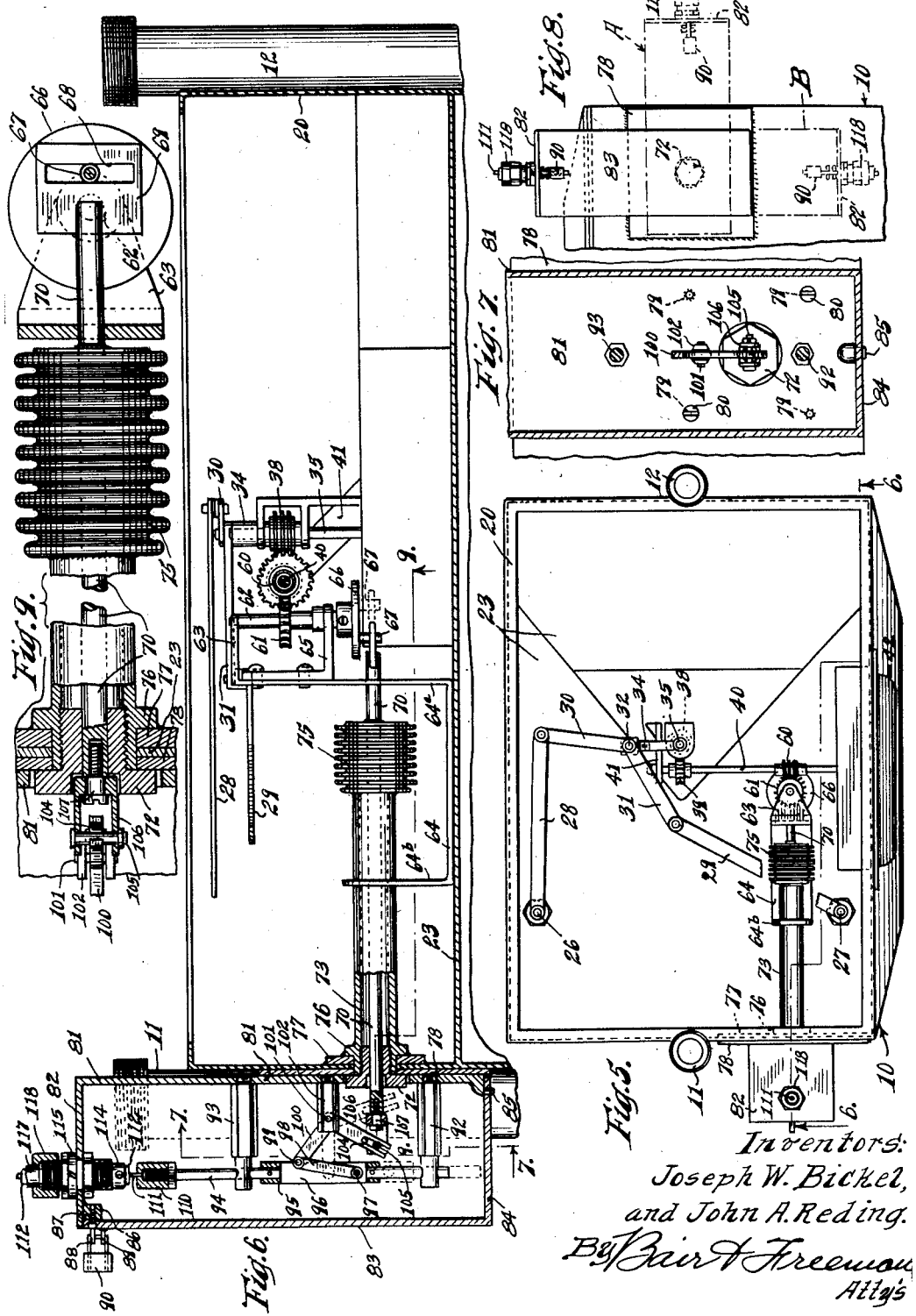

2,553,843

UNITED STATES PATENT OFFICE 2,553,843

REMOTE INDICATING REGISTER FOR GAS METERS

Joseph W. Bickel, Skokie, and John A. Reding, Evanston, Ill.

Application December 14, 1945, Serial No. 635,010

7 Claims. (Cl. 235—91)

The present invention relates to improvements in fluid meters, and more particularly to gas meters of the type adapted for measuring the quantity of gas passed through the meter in a certain period of time. Due to characteristics of construction of such meters as now used, it is necessary in certain geographical locations to locate the meter within a building. Meters of this type, as heretofore employed, are usually constructed with an indicating register, directly associated with the meter casing, and the meter casing serves to house suitable metering mechanism, actuated by the flow of gas through the casing, for operating the indicating register. Sometimes the total assembly of the casing, metering mechanism, and indicating register is referred to as a meter.

For certain installations, it has been found very awkward and inconvenient, and sometimes hazardous for persons to have access to the indicating register for reading it. In certain localities where there is considerable variation in temperature, such as in the mid-western states, it is necessary that gas meters be installed inside buildings, where temperatures are fairly constant, because the changing temperatures outside cause gas to expand or contract, which causes an inaccuracy in metering the gas. Also, this same change in temperatures causes a condensation of water in the meters, which at low temperature, would freeze, thus rendering the meter and indicating register inoperative and interrupting gas service to customers, which could prove very serious. By virtue of locating the meter with its indicating register within the building, it is thus necessary for persons whose duty it is to read the register, to enter the building at certain intervals of time for the purpose of recording the reading of the register in order that the customer may be periodically billed for the amount of gas consumed. By locating the meter and its indicating register within a building presents numerous objections and disadvantages. In such cases the person whose duty it is to read the register must be admitted to the building every time that the indicating register is to be read. This practice has been considered objectionable both from the customer viewpoint, as well as from the public utility company or other organization which supplies the gas. To admit the proper person to the building for reading of the indicating register frequently discommodes some person in the building, and during inclement weather, the floors of the building may become unnecessarily soiled by the entrance of such person. Such types of installation also make it necessary at times for persons whose duty it is to read the register to make several calls to the building in order to gain access thereto, thus resulting in a substantial loss of time and causing a certain inconvenience and expense to the company supplying gas service. Furthermore, there is at times, an element of danger and/or annoyance when a person, whose duty is to read the register, attempts to enter a building where there are certain animals kept in the building.

The primary object of the present invention is to provide a novel and improved gas meter and indicating register which eliminates the foregoing difficulties and objectionable conditions, and by virtue of which the meter proper may be located at any desired or convenient position within the building, and an indicating register may be located remotely from the meter, inside or outside of the building, at a desired or convenient location, and operative connections provided between the meter and the remotely located register.

Another object is to provide an improved gas meter of the character indicated, comprising a main indicating register, together with an auxiliary indicating register, located remotely from the meter and operably connected thereto and actuated by the conventional mechanism within the meter for causing the main and auxiliary registers to be operated in correspondence.

A further object is to provide a relatively inexpensive apparatus, capable of, and adapted for association with presently used types of gas meters, and comprising a remotely located indicating register, operably driven by the mechanism within the meter casing, and wherein the driving connections extend through the wall of the casing, and are fluid sealed relatively thereto in a manner so as not to interfere with or cause breakage of conventional solder sealing of certain portions of the casing.

Still another object is to provide an improved gas meter and remotely located indicating register construction which eliminates the above mentioned disadvantages and objectionable conditions of presently used gas meters, and which is durable in use, positive and accurate in operation, and capable of being economically manufactured.

Other objects and advantages of this invention will be apparent from the following description, taken in connection with the accompanying drawings in which:

Figure 1 is an elevational view, partly in section, showing an installation of a gas meter and remotely located indicating register, embodying the present invention;

Figure 2 is an enlarged, horizontal, sectional view, through the remotely located indicating register, taken substantially as indicated at line 2—2 on Figure 1;

Figure 3 is a transverse sectional view through the remotely located indicating register, taken substantially as indicated at line 3—3 on Figure 2;

Figure 4 is a fragmentary elevation or face view of the remotely located indicating register;

Figure 5 is a top view of a conventional combination meter and register, with the top of the casing removed, and embodying operating connections for actuating a remotely located indicating register, and embodying the present invention;

Figure 6 is an enlarged, fragmentary, vertical sectional view through the upper portion of the combination meter and indicating register, together with our novel operating connections for actuating a remotely located indicating register, and taken substantially as indicated at line 6—6 on Figure 5;

Figure 7 is a vertical sectional view through an external portion of the operating mechanism, associated with the meter casing, taken substantially as indicated at line 7—7 on Figure 6;

Figure 8 is a fragmentary elevational view of the meter casing, and the externally located operating connections enclosed within the housing and connected to the meter casing, and illustrating a plurality of positions of adjustment thereof;

Figure 9 is an enlarged sectional view of a portion of the novel operating mechanism, taken substantially as indicated at line 9—9 on Figure 6;

Figure 10 is a fragmentary elevational view of a portion of the meter casing provided with a sealed cap for enclosing the protruding portions of the operating connections, when the auxiliary, remotely located register is not required; and Figure 11 is a fragmentary front elevational view of the casing provided with said cap, taken substantially as indicated at line 11—11 on Figure 10.

The meter and remotely located indicating register embodying the present invention and as illustrated in Figure 1 of the drawings, comprises a conventional combined meter and register as indicated at 10, provided with usual inlet and outlet supply conduit connections 11 and 12. The conduit connection 11 is shown connected through suitable conventional fittings to a main supply pipe 14, and conduit connection 12 is shown connected to a service pipe 15, which, it may be understood, extends to suitable apparatus in the building or household, such as the heating plant, hot water heater, range, etc.

It is to be understood that the present invention in no manner or form alters the function or operation of the conventional combined meter and register 10. The present invention contemplates the addition of certain devices, mechanism, and operating parts so as to permit reading of an auxiliary indicating register, located remotely from the combined meter and indicating register, either within the building or exteriorly of the building.

As may be seen in the drawings, the conventional combined meter and indicating register 10, includes a sheet metal casing 20, having a removable top 21 which is usually soldered to the casing body to provide a complete fluid seal of the casing. The upper portion of the casing is provided with a transverse partition wall 23, through which projects a pair of upwardly extending shafts 26 and 27, located adjacent the front and rear walls respectively of the casing. By virtue of suitable apparatus mounted below the partition wall 23 (and not shown) and responsive to the flow of gas from the supply pipe 14, to the service pipe 15, said shafts 26 and 27 are moved oscillatably. Rigidly attached to the upper ends of the shafts 26 and 27 are arms 28 and 29, respectively, to which are pivotally connected levers 30 and 31, respectively, and the opposite ends of the levers being journaled on a trunnion 32, mounted on an arm 34, which in turn is rigidly attached to the upper end of a vertical shaft 35, which is supported in suitable bearings, not shown, in the partition wall 23. As the shafts 26 and 27 oscillate, due to passage of gas from the supply to the service pipe, the arm 34 causes rotation of the shaft 35. Mounted on said shaft 35, below the arm 34, is a worm 38, which meshes with a worm gear 39, and the latter is rigidly mounted on a horizontally extending shaft 40, journaled at one end in a suitable bracket 41, connected to the partition wall 23. The forward end of the shaft extends into and is operably connected with a conventional or main indicating register, designated generally at 42, which includes usual dial elements, visible from the external forward wall of the casing. It is to be understood that the combined meter and indicating register above described is a conventional construction which has been extensively used.

It is well known that meters of the type above described develop considerable power for effecting rotation of the register drive shaft 40. Since the power that is developed for effecting rotation of said shaft is far more than is utilized for actuating the main indicating register 42, we prefer to utilize such excess power to operate a remotely located auxiliary indicating register designated at 50, which in Figure 1 of the drawings, is shown mounted on the outer wall 52 of a building. Such an arrangement permits obtaining the great convenience and advantages above refered to.

Due to the construction of certain buildings, and also due to mechanism and apparatus located therein, it is sometimes necessary to locate the combined meter and register at a position which is extremely awkward and difficult of access to a person whose duty it is to read the indicating register. Sometimes it is necessary for such a person to move about among equipment which presents certain dangers and hazards. For such installations, the auxiliary indicating register 50 may be located at a convenient place of access, so as to avoid possible hazards and dangers which would be present in gaining access to read the main register associated directly with the meter.

The additional motion transmitting apparatus required for operation of the auxiliary indicating register 50, comprises mechanism mounted within the casing 20, above the partition wall 23. A worm gear 60 is rigidly attached to the drive shaft 40, which actuates the main indicating register 42, and meshed with said worm is a gear 61, fixedly mounted on a vertically disposed shaft 62, which in turn is journaled at its upper end in a horizontally extending leg 63 of a main supporting bracket 64, of generally U-shaped formation. The lower portion of the vertical shaft 62 is journaled in a leg of an angle bracket 65, connected to the adjacent upright leg 64a of the main bracket 64. Rigidly secured to the lower end of the shaft 62 is a driving disc 66, having a depending, eccentrically located pin 67, extending into a horizontally extending slot 68, of a driving block 69. Said block 69 is rigidly attached to the forward end of a horizontally extending shaft 70, the opposite end of which extends outwardly through a side wall of the casing 20, as seen in Figures 6 and 9. The inner end portion of said shaft 70, is journaled in said upright leg 64a of the supporting bracket 64, and the opposite end of the shaft is journaled in a coupling nut 72, as will hereinafter be described. Surrounding said shaft 70, in spaced relation thereto, is a sleeve 73, journaled in the other leg 64b of the supporting bracket 64, and rigidly connected, as by soldering, to one end of an expansible-contractible bellows 75. The other end of the bellows is rigidly secured, by a soldered connection, to the shaft 70, thus forming a fluid seal of the area of the chamber above the partition wall 23 with respect to the interior of said sleeve 73.

The opposite end of the sleeve 73, terminates in a flange 76, positioned in abutting engagement with, and soldered to a plate 77, which is formed with an aperture for the snug reception of the terminal portion of the sleeve 73. Said terminal portion of the sleeve also projects through aligned apertures, formed in the side wall of the casing 23, and an external mounting plate 78, as clearly seen in Figures 6 and 9 of the drawings. Said plate 77 is also soldered, around its marginal edges, to the inner wall of the casing so as to complete the fluid seal, around the openings through which shaft 70 extends, and thereby avoids possible escape of gas from within the casing, above said partition wall, to the exterior of the casing.

Thus by the threaded connection of the coupling nut 72, within the adjacent end of sleeve 73, said sleeve becomes firmly connected to the wall of the casing. It is preferred, however, that the support bracket 64 be permitted to merely rest upon the upper surface of the partition wall 23, so as to readily accommodate itself to a slight amount of movement as might be occasioned by strains or forces imposed upon the shaft 70; while at the same time permitting the worm gear 61 to remain in proper mesh with the worm 60 on shaft 40.

The plate 78 is rigidly attached to the outer wall of the casing, as by soldering, and in central relationship to the shaft 70. The plate 78 is provided with four threaded apertures 79, located equi-distant from the axis of the shaft 70, and in the same angular relationship to each other, as clearly seen in Figure 7 of the drawings. Adapted to be secured to said plate 78, by a pair of diagonally or oppositely arranged screws 80, is a supporting bracket 81, the upper end of which terminates in a horizontally extending leg 82. Said supporting bracket and leg constitute a part of a rectangular housing structure when there is associated therewith a closure element 83, of rectangular form, and of U-shaped cross section and including a bottom wall 84. The supporting bracket 81 and closure element 83 thus form a total enclosure for mechanism to be presently described. In closed relation, the closure member is adapted to be positioned in co-relation to the supporting bracket 81 by registering an aperture formed in its bottom wall 84, in seated relation on a pin 85, at the lower end of the bracket member 81, as seen in Figure 6. The outer face of the closure member 83 abuts against a lug 86, depending from the underside of the horizontal leg 82 of the supporting bracket, and the closure 83 is connected to said bracket 81 by a screw 87, the head of which is formed with an outwardly extending, apertured lug 88, adapted to be aligned with a lug 89 secured to and projecting laterally from the outer surface of the intermediate wall of the closure member 83. To preclude unauthorized access, without visual indication, to the mechanism within the housing formed by the bracket 81, and closure member 83, a conventional lead-wire seal, indicated generally at 90, is employed for interconnecting said lugs 88 and 89.

Rigidly attached to the upright leg of the supporting bracket 81, are a pair of horizontally extending, vertically spaced apart studs 92 and 93, the outer ends of which are apertured to provide support and guidance for a reciprocable, compound rod 94. Said rod 94 includes an intermediate body portion 95, provided with an elongated slot 96, in which there is pivoted at 97 one end of a lever 98. The opposite end of said lever is pivoted at 99 to outer end of one arm of a bell crank lever 100, which in turn is fulcrumed at 101 on a horizontally extending stud 102, which is carried by the supporting bracket 81. The outer end of the other leg of the bell crank lever is slotted as indicated at 104, with the slotted portion engaging a pin 105, secured in the outer end of a U-shaped bracket or clevis 106. Said clevis is secured by means of a screw 107 to the outer end of the shaft 70, as clearly seen in Figures 6 and 9 of the drawings.

Threaded on the upper end of the reciprocable rod 94 is a coupler 110, to which is rigidly attached an operating wire 111, carried in a flexible, tubular sleeve 112. The wire and sleeve are sometimes referred to commercially as a "Bowden wire." The tubular sleeve is held in position by a set collar 114, and extends through a coupling 115, carried on the leg 82 of the supporting bracket 81. The Bowden wire assembly is preferably encased in flexible tubing such as copper tubing, as indicated at 117, which is attached at one end by a coupling nut 118, to the coupling 115 on the supporting member.

The Bowden wire and copper tubing may be of a desired length to accommodate a desired location of the remotely located auxiliary indicating register 50. As shown in Figure 1 of the drawings, the auxiliary register is mounted on the outer wall of the building in which the combined meter and main indicating register is located. The opposite end of the Bowden wire and tubing is preferably encased, in the installation as shown in Figure 1, in a section of pipe as indicated at 119, and a set collar 119a is mounted on the inner end of the pipe in abutting relation to the inner surface of the building wall. The opposite end of the pipe is threaded into a fitting 121, attached to the end wall of the casing 123 of the auxiliary indicating register.

The casing of the auxiliary indicating register, as indicated at 123, is of flat, rectangular, box-like structure with one end open and adapted to be closed by an end wall 125, which includes at the upper end, a horizontally extending guide flange 126, and a supporting panel 127 at its lower end, adapted to be telescoped within the box-like body of the casing. The opposite or forward face of the casing is provided with an aperture 130, and a pair of sealed, spaced apart, transparent panels 131 and 132, are disposed in registration with said aperture. The box-like portion of the casing is adapted to be telescopically removed from the end panel 125, and is adapted to be secured in assembled relation thereto by a set screw 136, extending upwardly through the bottom wall of the body, in threaded engagement with a lug 137 on the upper surface of the supporting panel 127, associated with the stationary end 125. The head of the screw is apertured and is adapted to be registered with apertures of a pair of aligned lugs 138 and 139 on the underside of the box-like structure of the casing for the reception of a conventional lead-wire seal, indicated generally at 141, so as to discourage tampering with the indicating register, as well as readily indicating unauthorized tampering therewith.

Mounted on the supporting panel 127 is a standard, commercially available registering device 160, including a series of numbered dials 161, which are inter-connected in a conventional manner so that after a predetermined amount of rotation of one, the next successive dial of the series is rotated a portion of a revolution. The registering device includes a horizontally extending shaft 164 on the outer end of which is rigidly attached a ratchet wheel 165. Mounted on a vertical pivot 167 is an actuating arm 168, which is inter-connected by a coil spring 169 to a coupler 170 which in turn is rigidly attached to the other end of the inner wire 111, of the Bowden wire assembly. The outer end of said arm 168 is movable in a predetermined range between a pair of adjustable stops, in the form of adjustable screws 172 and 173, and said arm is normally urged against stop 173, by a coil spring 174 connected to said arm, and to an upstanding lug 175. Rigidly attached to said arm, intermediate its length, is a resilient actuating pawl 177, the free end of which is positioned to engage the teeth of the ratchet wheel 165. In order to insure maintaining the indicating register device 160, at a position to which it has been moved, a detent pawl 180 is provided, and the free end thereof is positioned in engagement with the teeth of the ratchet wheel in a manner to prevent reverse rotation thereof.

It will now be apparent that the auxiliary indicating register is actuated by impulses of motion transmitted from the mechanism within the meter casing 23. It is to be understood that the gear reduction from the shaft 40, and the register 160 are so co-related that the auxiliary indicating register will at all times be in exact correspondence with the main indicating register 42, directly associated with the meter.

It will now be apparent that each time that the vertical shaft 62 rotates one-half revolution, the horizontal shaft 70 is retracted from the position seen in Figure 6 of the drawings to the position seen in Figure 9, and by virtue of which movement, motion is transmitted through the bell crank member 100, lever 98, to the reciprocating shaft 94, for pulling on the wire 111 of the "Bowden wire" assembly, and which, through means of spring 169, in the auxiliary indicating register assembly, causes the arm 168 to be moved in a clockwise direction, as seen in Figure 2, to abut against stop 172, against the reaction of the spring 174. Such movement of the arm 168 causes its pawl 177 to cam over the teeth of the ratchet wheel 165 to a position for engaging the next tooth thereof. As the vertical shaft 62 in the meter casing completes the next half revolution, the shaft 70 returns to the position seen in Figure 6 of the drawings, and through the linkage above described, tends to push on the wire 111, and which wire is partially pulled back to its normal position by the spring 169, arm 168 and the coil spring 174 located within the housing of the auxiliary indicating register. During such latter movement of the arm 168 its pawl 177, is caused to move the ratchet wheel 165, the extent of one tooth. By virtue of this arrangement the ratchet wheel is operated in a step-by-step manner, the extent of one tooth, during each complete revolution of the shaft 62 driven by the meter mechanism.

By virtue of the bellows 75, inter-connecting the shaft 70 and the sleeve 73, and the soldered connections of the sleeve and associated plates to the inner wall of the casing, a fluid tight seal is provided to preclude possible escape of the gas from the upper portion of the casing, above the partition wall 23.

For certain installations, it may be necessary to locate the auxiliary meter at such a position as would render it more convenient if the direction of extension of the "Bowden wire" and copper tubing could be altered. For accommodating this condition, the supporting bracket 81, with its closure member 83, and mechanism mounted therein, may be rotated in either direction, 90°, to a position such as indicated at A, or 180°, to a position as indicated at B, in Figure 8 of the drawings. To so reposition the closure structure and operating linkage on the outside of the casing, merely necessitates removal of the screws 80 and rotating the supporting bracket 81 to the desired position of adjustment, and then reconnecting it to said plate 78 by said screws 80.

For economy in manufacture, it is contemplated that all meters of the combined type, such as indicated at 10, in the drawings, be provided with operating mechanism within the casing 23, such as illustrated in the drawings. For installations, where it is not necessary or desirable to employ an auxiliary, remotely located indicating register, the outer end of the shaft 70 may be enclosed by a rectangular cap, as indicated at 185, which is secured in place by special studs 186, passing through the outer end wall of the cap and threaded into threaded holes 79 of the plate 78. The outer ends of said studs are apertured and interconnected by a conventional lead-wire seal 188 for the above stated purposes.

Although we have herein shown and described a preferred embodiment of our invention, manifestly it is capable of modification and rearrangement of parts without departing from the spirit and scope thereof. We do not, therefore, wish to be understood as limiting this invention to the precise embodiment herein disclosed, except as we may be so limited by the appended claims.

We claim as our invention:

1. For use with a primary indicating gas meter register which is actuated by a rotating shaft and is enclosed in a casing installed within a building, the combination comprising a reciprocable element within the casing and operably driven by said shaft and having a portion extending through an opening in the wall of the casing, a sleeve surrounding a portion of the length of said element and having one end connected to the wall of the casing to form a fluid seal with respect to said opening, an expansible-contractible bellows, sealed at one end to the opposite end of said sleeve, the other end of said bellows being sealed in surrounding relation to said element, beyond the last mentioned end of the sleeve, an auxiliary register located remote from the casing, and means comprising motion transmitting mechanism mounted on the outer wall of the casing and operably connected to said extending portion of said element, a Bowden wire connecting said motion transmitting mechanism and said auxiliary register, means for reciprocating said Bowden wire, and means for transmitting the motion of said Bowden wire to said auxiliary register.

2. For use with a primary indicating gas meter register which is actuated by a rotating shaft and is enclosed in a casing installed within a building, the combination comprising a reciprocable element within the casing and operably driven by said shaft and having a portion extending through an opening in the wall of the casing, gear means connected to said shaft adapted to reciprocate said element, a second reciprocable element mounted on the exterior of the casing and being reciprocable substantially transversely to said first reciprocable element, a bell crank lever operably interconnecting said reciprocable elements, a Bowden wire connected to and reciprocated by said second reciprocable element, and an auxiliary register located remote from the casing, said auxiliary register being connected to and actuated by said Bowden wire.

3. For use with a primary indicating gas meter register which is actuated by a rotating shaft and is enclosed in a casing installed within a building, the combination comprising a reciprocable element within the casing and having a portion extending through an opening in the wall of the casing, gear means connected to said shaft adapted to reciprocate said element, flexible means connected in surrounding relation to said element for sealing said opening, a second reciprocable element mounted on the exterior of the casing and being reciprocable substantially transversely to said first reciprocable element, a bell crank lever operably interconnecting said reciprocable elements, a Bowden wire connected to and reciprocated by said second reciprocable element, and an auxiliary register located remote from the casing, said auxiliary register being connected to and actuated by said Bowden wire.

4. For use with a primary indicating gas meter register which is actuated by a rotating shaft and is enclosed in a casing installed within a building, the combination comprising a reciprocable element within the casing and operably driven by said shaft and having a portion extending through an opening in the wall of the casing, a sleeve surrounding a portion of the length of said element and having one end connected to the wall of the casing to form a fluid seal with respect to said opening, an expansible contractible bellows, sealed at one end to the opposite end of said sleeve, the other end of said bellows being sealed in surrounding relation to said element, beyond the last mentioned end of the sleeve, a second reciprocable element mounted on the exterior of the casing and being reciprocable substantially transversely to said first reciprocable element, a bell crank lever operably interconnecting said reciprocable elements, a Bowden wire connected to and reciprocated by said second reciprocable element, and an auxiliary register located remote from the casing, said auxiliary register being connected to and actuated by said Bowden wire.

5. For use with a primary indicating gas meter register which is actuated by a rotating shaft and is enclosed in a casing installed within a building, the combination comprising an element within the casing and operably driven by said shaft, said element having a portion extending through an opening in the wall of the casing, means constituting a fluid seal adjacent to said element and for sealing the opening in the wall of the casing, an auxiliary register located remote from the casing, motion transmitting mechanism operably connected to said extending portion of said element and lying in a plane transverse to the element, means for variably positioning said motion transmitting mechanism in a plane transverse to the element, a Bowden wire connecting said motion transmitting mechanism and said auxiliary register, means for reciprocating said Bowden wire, and means for transmitting the motion of said Bowden wire to said auxiliary register.

6. For use with a primary indicating gas meter register which is actuated by a rotating shaft, and is enclosed in a casing installed within a building, the combination comprising a movable actuating rod within the casing, power transmitting means interconnecting said shaft and rod for actuating the latter, said rod having a portion extending through an opening in the wall of the casing, an expansible, contractible bellows mounted in surrounding relation to a portion of said rod and connected at its inner end in sealed relation to said rod, the other end being connected in sealed relation with respect to said opening in the casing, an auxiliary register located remotely from the casing, and a Bowden wire connected to said extending portion of said rod and to said auxiliary register for transmitting movement from said shaft to said auxiliary register, whereby said auxiliary register is caused to be operated in cooperative relation to said shaft of the gas meter register.

7. For use with a primary indicating gas meter register which is actuated by a rotating shaft, and is enclosed in a casing installed within a building, the combination comprising a movable actuating rod within the casing, power transmitting means interconnecting said shaft and rod for actuating the latter, said rod having a portion extending through an opening in the wall of the casing, a flexible bellows having one end solder-sealed to an intermediate portion of said rod, and having its opposite end solder-sealed with respect to said opening in the casing, an auxiliary register located remotely from the casing, and a Bowden wire connected to said extending portion of said rod and to said auxiliary register for transmitting movement from said shaft to said auxiliary register, whereby said auxiliary register is caused to be operated in cooperative relation to said shaft of the gas meter register.

JOSEPH W. BICKEL.
JOHN A. REDING.

REFERENCES CITED

The following references are of record in the file of this patent:

UNITED STATES PATENTS

| Number | Name | Date |
|---|---|---|
| 5,914 | Oldroyd | Nov. 14, 1848 |
| 596,072 | Kugler | Dec. 28, 1897 |
| 751,007 | Pratt et al. | Feb. 2, 1904 |
| 1,093,808 | Staaf | Apr. 21, 1914 |
| 1,298,646 | Berg | Apr. 1, 1919 |
| 1,414,964 | Lossing | May 2, 1922 |
| 1,471,981 | Sargent | Oct. 23, 1923 |
| 1,671,012 | Collins | May 22, 1928 |
| 1,903,449 | Gath | Apr. 11, 1933 |
| 2,094,711 | Leininger | Oct. 5, 1937 |
| 2,123,577 | Pelich | July 12, 1938 |
| 2,137,524 | Bugg | Nov. 22, 1938 |

FOREIGN PATENTS

| Number | Country | Date |
|---|---|---|
| 788,865 | France | Aug. 5, 1936 |